(12) United States Patent
Vågeskar et al.

(10) Patent No.: US 9,897,713 B2
(45) Date of Patent: Feb. 20, 2018

(54) HYDRODYNAMIC DEPRESSOR FOR MARINE SENSOR STREAMER ARRAYS

(71) Applicant: PGS Geophysical AS, Oslo (NO)

(72) Inventors: Erling Vågeskar, Ulsteinvik (NO); Kenneth Karlsen, Oslo (NO)

(73) Assignee: Petroleum Geo-Services, Inc., Houston, TX (US)

( * ) Notice: Subject to any disclaimer, the term of this patent is extended or adjusted under 35 U.S.C. 154(b) by 328 days.

(21) Appl. No.: 14/727,897

(22) Filed: Jun. 2, 2015

(65) Prior Publication Data
US 2015/0268366 A1 Sep. 24, 2015

Related U.S. Application Data

(63) Continuation of application No. 12/590,123, filed on Nov. 3, 2009, now Pat. No. 9,075,165.

(51) Int. Cl.
G01V 1/38 (2006.01)

(52) U.S. Cl.
CPC .......... *G01V 1/3826* (2013.01); *G01V 1/3808* (2013.01)

(58) Field of Classification Search
CPC .................................................. G01V 1/3826
See application file for complete search history.

(56) References Cited

U.S. PATENT DOCUMENTS

| | | | | |
|---|---|---|---|---|
| 2,729,300 A * | 1/1956 | Paslay | ................. | G01V 1/3826 114/244 |
| 4,075,967 A * | 2/1978 | Silvey | ................. | B63B 21/663 114/243 |
| 5,678,504 A | 10/1997 | Toplosky et al. | | |
| 6,533,627 B1 | 3/2003 | Ambs | | |
| 9,766,360 B2 * | 9/2017 | Schneider | ............ | G01V 1/3835 |
| 2002/0064088 A1 | 5/2002 | Barker | | |
| 2004/0035349 A1 * | 2/2004 | Barker | ................. | B63B 21/663 114/243 |
| 2008/0192570 A1 * | 8/2008 | Tenghamn | ........... | G01V 1/3826 367/17 |
| 2009/0003129 A1 * | 1/2009 | Stokkeland | ............. | B63B 21/66 367/16 |
| 2009/0245019 A1 | 10/2009 | Falkenberg | | |
| 2012/0195162 A1 * | 8/2012 | Borgen | ................. | G01V 1/3826 367/16 |

(Continued)

FOREIGN PATENT DOCUMENTS

GB 2393703 A 4/2004

OTHER PUBLICATIONS

Search Report European Patent Application No. 10188660.4.
Examination Report Australian Patent Application No. 2010236078.

*Primary Examiner* — Krystine E Breier
(74) *Attorney, Agent, or Firm* — Richard A. Fagin

(57) ABSTRACT

A hydrodynamic foil system for a sensor streamer array includes towing equipment coupled to a survey vessel. The towing equipment includes at least one spreader cable extending substantially transversely to a direction of motion of the survey vessel. A plurality of laterally spaced apart sensor streamers is coupled at respective forward ends thereof to the towing equipment. A plurality of foils disposed on the spreader cable, the foils configured to provide hydrodynamic lift in a vertical direction as the at least one spreader cable is moved through the water. The foils are each rotatable about the spreader cable.

11 Claims, 2 Drawing Sheets

(56) References Cited

U.S. PATENT DOCUMENTS

| 2014/0247691 A1* | 9/2014 | Martin | B63B 21/66 |
| | | | 367/16 |
| 2014/0269177 A1* | 9/2014 | Koh | G01V 1/3826 |
| | | | 367/17 |
| 2017/0235004 A1* | 8/2017 | Boberg | G01V 1/3808 |
| | | | 367/17 |

* cited by examiner

HYDRODYNAMIC DEPRESSOR FOR MARINE SENSOR STREAMER ARRAYS

CROSS-REFERENCE TO RELATED APPLICATIONS

Continuation of U.S. patent application Ser. No. 12/590,123 filed on Nov. 3, 2009.

STATEMENT REGARDING FEDERALLY SPONSORED RESEARCH OR DEVELOPMENT

Not applicable.

NAMES OF THE PARTIES TO A JOINT RESEARCH AGREEMENT

Not Applicable

BACKGROUND

This disclosure relates generally to the field of marine geophysical surveying. More particularly, the invention relates to devices for controlling depth of the forward end of sensor streamers in a marine geophysical survey system.

Marine geophysical survey systems include seismic surveying systems. Seismic surveying systems are used to acquire seismic data from Earth formations below the bottom of a body of water, such as a lake or ocean. Marine seismic surveying systems typically include a seismic vessel having onboard navigation, seismic energy source control, and data recording equipment. The seismic vessel is typically configured to tow one or more streamers through the water. At selected times, the seismic energy source control equipment causes one or more seismic energy sources (which may be towed in the water by the seismic vessel or by another vessel) to actuate. Signals produced by various sensors on the one or more streamers are ultimately conducted to the data recording equipment, where a record with respect to time is made of the signals produced by each sensor (or groups of such sensors). The recorded signals are later interpreted to infer the structure and composition of the Earth formations below the bottom of the body of water.

The one or more streamers are in the most general sense long cables that have seismic sensors disposed at spaced apart positions along the length of the cables. A typical streamer can extend behind the seismic vessel for several kilometers. Because of the great length of the typical streamer, the streamer may not travel entirely in a straight line behind the seismic vessel at every point along its length due to interaction of the streamer with the water and currents in the water, among other factors.

More recently, marine seismic acquisition systems have been designed that include a plurality of such streamers towed by the seismic vessel in parallel. The streamers are towed by the vessel using towing devices, and associated equipment that maintain the streamers at selected lateral distances from each other as they are towed through the water. Such multiple streamer systems are used in what are known as three dimensional and four dimensional seismic surveys. A four dimensional seismic survey is a three dimensional survey over a same area of the Earth's subsurface repeated at selected times. The individual streamers in such systems are affected by the same forces that affect a single streamer.

The quality of images of the Earth's subsurface produced from three dimensional seismic surveys is affected by how well the positions of the individual sensors on the streamers are controlled. The quality of images generated from the seismic signals also depends to an extent on the relative positions of the seismic receivers being maintained throughout the seismic survey. Various devices are known in the art for positioning streamers laterally and/or at a selected depth below the water surface. U.S. Pat. No. 5,443,027 issued to Owsley et al., for example, describes a lateral force device for displacing a towed underwater acoustic cable that provides displacement in the horizontal and vertical directions. The device has a hollow spool and a rotationally mounted winged fuselage. The hollow spool is mounted on a cable with cable elements passing therethrough. The winged fuselage is made with the top half relatively positively buoyant and the bottom half relatively negatively buoyant. The winged fuselage is mounted about the hollow spool with clearance to allow rotation of the winged fuselage. The difference in buoyancy between the upper and lower fuselage maintains the device in the correct operating position. Wings on the fuselage are angled to provide lift in the desired direction as the winged fuselage is towed through the water. The device disclosed in the Owsley et al. patent provides no active control of direction or depth of the streamer, however.

U.S. Pat. No. 6,011,752 issued to Ambs et al. describes a seismic streamer position control module having a body with a first end and a second end and a bore therethrough from the first end to the second end for receiving a seismic streamer. The module has at least one control surface, and at least one recess in which is initially disposed the at least one control surface. The at least one control surface is movably connected to the body for movement from and into the at least one recess and for movement, when extended from the body, for attitude adjustment. Generally, the device described in the Ambs et al. patent is somewhat larger diameter, even when closed, than the streamer to which it is affixed, and such diameter may become an issue when deploying and retrieving streamers from the water.

U.S. Pat. No. 6,144,342 issued to Bertheas et al. describes a method for controlling the navigation of a towed seismic streamer using "birds" affixable to the exterior of the streamer. The birds are equipped with variable-incidence wings and are rotatably fixed onto the streamer. Through a differential action, the wings allow the birds to be turned about the longitudinal axis of the streamer so that a hydrodynamic force oriented in any given direction about the longitudinal axis of the streamer is obtained. Power and control signals are transmitted between the streamer and the bird by rotary transformers. The bird is fixed to the streamer by a bore closed by a cover. The bird can be detached automatically as the streamer is raised so that the streamer can be wound freely onto a drum. The disclosed method purportedly allows the full control of the deformation, immersion and heading of the streamer.

It is also important to control the depth of the streamers in the water so that effects of seismic signal reflection from the water-air interface can be controlled. There exists a need for devices to control the depth of the forward end of a streamer in a streamer array in the water.

While the explanation of the need for such devices is generally explained in terms of seismic surveying, it is important to recognize that devices according to the present disclosure are applicable to any survey system which includes a plurality of laterally spaced apart sensor streamers towed by a vessel. Such other types of streamers may include, without limitation, electrodes, magnetometers and temperature sensors. Accordingly, the invention is not limited in scope to seismic streamers.

DETAILED DESCRIPTION

Figure 1:
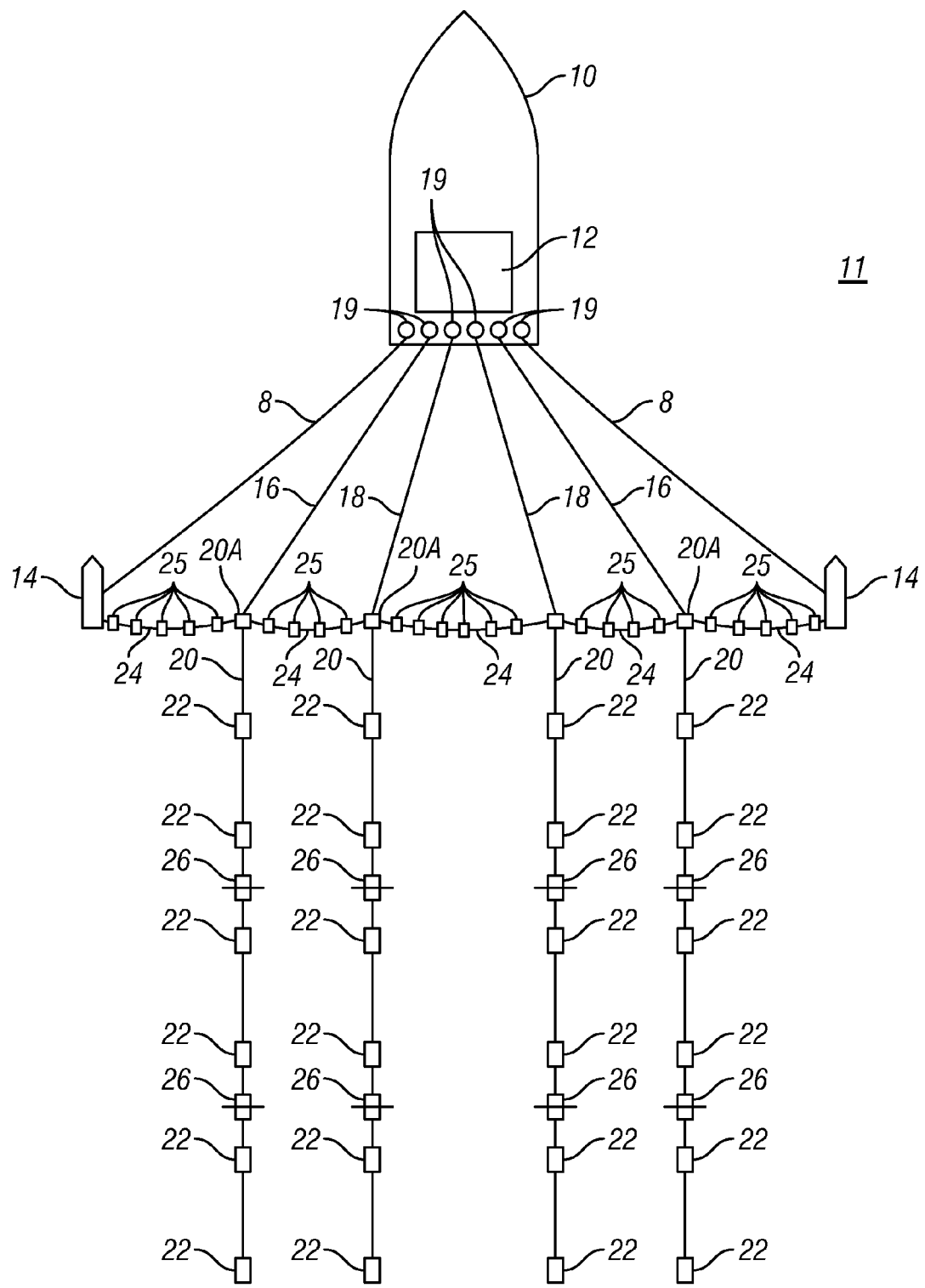
FIG. 1 shows an example embodiment of a marine geophysical surveying system.

FIG. 1 shows an example marine geophysical survey system that may include a plurality of sensor streamers laterally spaced from each other. Each of the sensor streamers can be guided through the water by one or more lateral force and depth ("LFD") control devices cooperatively engaged with each of the streamers, although the LFD devices are not required to be used in the present invention. The marine geophysical survey system includes a survey vessel 10 that moves along the surface of a body of water 11 such as a lake or the ocean. The survey vessel 10 may include thereon equipment, shown at 12 and for convenience collectively called a "recording system." The recording system 12 typically includes a recording unit for making a record with respect to time of signals generated by various seismic sensors e.g., as shown at 22, in the system. The recording system 12 also typically includes navigation equipment to determine at any time the position of the vessel 10 and each of the sensors 22 disposed at spaced apart locations on streamers 20 towed by the vessel 10. The foregoing elements of the recording system 12 are familiar to those skilled in the art and are not shown separately in the figures herein for clarity of the illustration.

The sensors 22, for example, can be any type of seismic sensor known in the art such as motion responsive sensors, acceleration sensors, pressure sensors, pressure time gradient sensors or any combination thereof. Seismic sensors measure seismic energy primarily reflected from various structures in the Earth's subsurface below the bottom of the water 11. The seismic energy may originate from a seismic energy source (not shown) deployed in the water 11. The seismic energy source (not shown) may be towed in the water 11 by the survey vessel 10 or a different vessel (not shown). The recording system 12 may also include seismic energy source control equipment (not shown separately). In other non-limiting examples, the sensors 22 may be electromagnetic sensors such as electrodes, wire loops or coils or magnetometers, and the energy source (not shown) may be an electromagnetic transmitter.

In the survey system shown in FIG. 1, there are four sensor streamers 20 towed by the survey vessel 10. The number of sensor streamers may be different in any particular implementation of a survey system according to the various aspects of the invention, therefore, the number of streamers such as shown in FIG. 1 is not intended to limit the scope of the invention.

As explained in the Background section herein, in marine geophysical survey systems such as shown in FIG. 1 that include a plurality of laterally spaced apart streamers, the streamers 20 are coupled to towing equipment that secures the forward ends of the streamers 20 at selected lateral positions with respect to each other and with respect to the survey vessel 10. As shown in FIG. 1, the towing equipment can include two paravane tow ropes 8 or cables each coupled to the vessel 10 at one end through a winch 19 or similar spooling device that enables changing the deployed length of each paravane tow rope 8. As used herein, "tow rope" is intended to mean any generally spoolable device to transmit axial tension and can include fiber rope, armored cable or any similar device or combination of devices for such purpose. The distal end of each paravane tow rope 8 is functionally coupled to a paravane 14. The paravanes 14 are each shaped to provide a lateral component of motion to the various towing components deployed in the water 11 when the paravanes 14 are moved through the water 11. "Lateral" in the present context means transverse to the direction of motion of the vessel 10. The lateral motion component of each paravane 14 is opposed to that of the other paravane 14, and is generally in a direction transverse to the centerline of the survey vessel 10 and thus its direction of motion. The combined lateral motion of the paravanes 14 separates the paravanes 14 from each other until they place the components of the survey system in selected lateral positions. In one example, the separation is selected to place into tension one or more spreader ropes or cables 24. The spreader ropes or cables 24 may be interconnected across the entire span between the paravanes 14, or in other example may be separated.

The streamers 20 are each coupled, at the axial end thereof nearest the survey vessel 10 ("forward end"), to a respective lead-in cable termination 20A. The lead-in cable terminations 20A are coupled to or are associated with the spreader ropes or cables 24 so as to fix the lateral positions of the streamers 20 with respect to each other and with respect to the survey vessel 10. Electrical and/or optical connection between the appropriate components in the recording system 12 and, ultimately, the sensors 22 (and/or other circuitry) in the ones of the streamers 20 inward of the lateral edges of the system may be made using inner lead-in cables 18, each of which terminates in a respective lead-in cable termination 20A. A lead-in termination 20A is disposed at the vessel end of each streamer 20. Corresponding electrical and/or optical connection between the appropriate components of the recording unit 12 and the sensors in the laterally outermost streamers 20 may be made through respective lead-in terminations 20A, using outermost lead-in cables 16. Each of the inner lead-in cables 18 and outermost lead-in cables 16 may be deployed by a respective winch 19 or similar spooling device such that the deployed length of each cable 16, 18 can be changed.

The spreader ropes or cables 24 may include thereon a plurality of depth control foils 25 (which will be explained with reference to FIGS. 2 and 3). The depth control foils 25 provide hydrodynamic lift, typically in the form of downward force on the spreader cables 24 so that the spreader cables 24 and thus the front ends of the streamers (e.g., at terminations 20A) may be submerged to a selected depth in the water 11.

The system shown in FIG. 1 may also include a plurality of LFD control devices 26 cooperatively engaged with each of the streamers 20 at selected positions along each streamer 20. Each LFD control device 26 includes rotatable control surfaces that when moved to a selected rotary orientation with respect to the direction of movement of such surfaces through the water 11 create a hydrodynamic lift in a selected direction to urge the streamer 20 in any selected direction upward or downward in the water 11 or transverse to the direction of motion of the survey vessel 10. Thus, such LFD control devices 26 can be used to maintain the streamers in a selected geometric arrangement.

Figure 2:
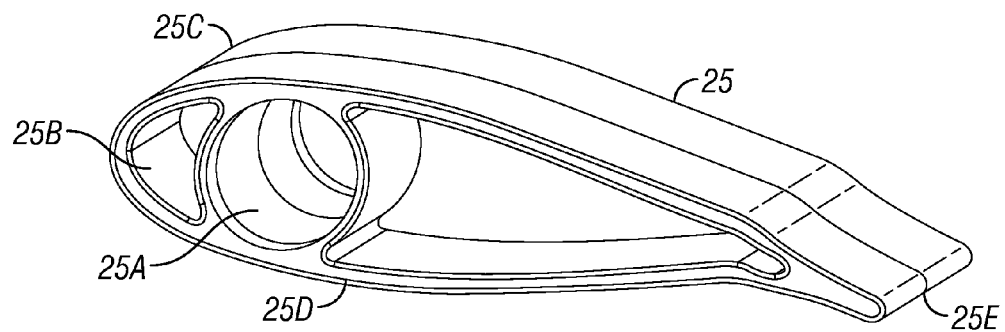
FIG. 2 shows one example of a hydrodynamic foil couple to a spreader cable in the system of FIG. 1.

An example of one of the depth control foils 25 is shown in oblique view FIG. 2. The foil 25 may include an opening 25A proximate the forward end 25B thereof that will enable coupling the foil 25 on the spreader cable (24 in FIG. 1). The forward end 25B of the foil 25 may be shaped to reduce hydrodynamic drag as the survey system (see FIG. 1) is towed through the water (11 in FIG. 1). Each foil 25 may include a curved upper surface 25C and a tail 25E extending therefrom that extends from the upper surface 25C of the foil. The respective lengths of the upper surface 25C, the tail 25E and the lower surface 25D of the foil 25 are configured to generate the desired hydrodynamic force. The foil 25 will thus generate downward force as it is moved through the water by Bernoulli's principle. If in certain circumstances it is desired to create upward force on the spreader cable (24 in FIG. 1), the foils 25 may be mounted on the spreader cable (24 in FIG. 1 in the opposite configuration to generate upward lift.

Figure 3:
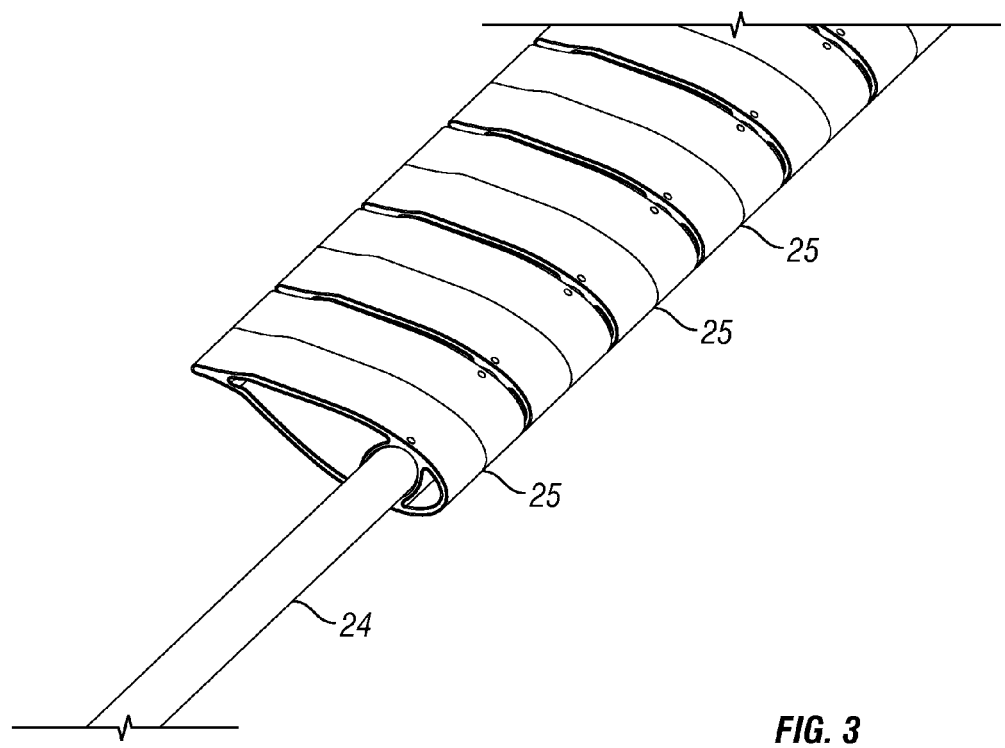
FIG. 3 shows a plurality of the foils of FIG. 2 affixed to a portion of an example spreader cable as shown in FIG. 1.

FIG. 3 shows a plurality of foils 25 disposed side by side on a segment of spreader cable 24. A hydrodynamic depressor made up of a number of small individual foils 25 as shown in FIG. 3 effectively form a long wing. The foils 25 can rotate freely around the spreader cable 24 for them to be able to adjust to the optimal angle when dragged through the water (11 in FIG. 1), and also to be flexible for deck handling and to allow for storage on a winch (e.g., 19 in FIG. 1).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hydrodynamic foil system for a sensor streamer array, comprising:
   towing equipment coupled to a survey vessel, the towing equipment comprising at least one spreader cable extending substantially transversely to a direction of motion of the survey vessel;
   a plurality of laterally spaced apart sensor streamers is coupled at respective forward ends thereof to the towing equipment; and
   a plurality of foils disposed on the spreader cable, the foils configured to provide hydrodynamic lift in a vertical direction as the at least one spreader cable is moved through the water, respective lengths of a curved upper surface, a tail and a lower surface of each foil configured to generate the hydrodynamic lift, wherein the foils are each separately rotatable about the spreader cable.

2. The hydrodynamic foil system of claim 1, wherein the spreader cable comprises a plurality of cable segments.

3. The hydrodynamic foil system of claim 2, wherein at least one of the sensor streamers is coupled to at least one of the plurality of cable segments.

4. The hydrodynamic foil system of claim 1, wherein the towing equipment comprises at least two tow ropes each coupled at one end to a survey vessel and at the other end to a paravane, the paravanes configured to provide lateral outward force as the vessel and paravanes are moved through a body of water and wherein the at least one spreader cable is coupled to each of the paravanes.

5. A hydrodynamic foil system for a sensor streamer array, comprising:
   at least two tow ropes each coupled at one end to a survey vessel and at the other end to a paravane, the paravanes configured to provide lateral outward force as the vessel and paravanes are moved through a body of water;
   a plurality of spreader cable segments coupled to each of the paravanes;
   a plurality of laterally spaced apart sensor streamers each coupled at a forward end thereof to at least one of the plurality of spreader cable segments; and
   a plurality of foils disposed on at least one of the spreader cable segments, the foils configured to provide hydrodynamic lift in a vertical direction as the spreader cable segments are moved through the water, respective lengths of a curved upper surface, a tail and a lower surface of each foil configured to generate the hydrodynamic lift, wherein the foils are each configured to freely separately rotate about the at least one spreader cable segment.

6. A method for operating a geophysical data acquisition system, comprising:
   moving a survey vessel through a body of water having towing equipment coupled thereto, the towing equipment comprising at least two tow ropes extending from the survey vessel, a distal end of each tow rope having a paravane coupled thereto;
   maintaining a lateral separation between the paravanes using at least one spreader cable coupled to each paravane;
   towing a plurality of sensor streamers coupled at respective forward ends thereof at laterally spaced apart positions to the towing equipment; and
   applying a selected vertical force to the at least one spreader cable along a length thereof to move the at least one spreader cable to a selected depth in the body of water, wherein the vertical force is applied by a plurality of foils coupled to the at least one spreader cable, respective lengths of a curved upper surface, a tail and a lower surface of each foil configured to generate the vertical force, the plurality of foils each separately rotatable about the at least one spreader cable.

7. The method of claim 6 wherein the vertical force is in a downward direction.

8. The method of claim 7 further comprising detecting seismic signals using seismic sensors disposed along the plurality of streamers.

9. The method of claim 6, wherein the at least one spreader cable comprises a plurality of cable segments.

10. The method of claim 9, wherein at least one of the sensor streamers is coupled to at least one of the plurality of cable segments.

11. The method of claim 6, wherein at least one of the sensor streamers is coupled to the at least one spreader cable.

* * * * *

UNITED STATES PATENT AND TRADEMARK OFFICE
CERTIFICATE OF CORRECTION

PATENT NO. : 9,897,713 B2
APPLICATION NO. : 14/727897
DATED : February 20, 2018
INVENTOR(S) : E. Vageskar et al.

It is certified that error appears in the above-identified patent and that said Letters Patent is hereby corrected as shown below:

On the Title Page

Item (73) in the name of the Assignee, please delete "Petroleum Geo-Services, Inc." and insert, --PGS Geophysical,A.S.--

Signed and Sealed this
Twenty-third Day of April, 2019

Andrei Iancu
*Director of the United States Patent and Trademark Office*